US009135151B2

(12) United States Patent
Betak et al.

(10) Patent No.: US 9,135,151 B2
(45) Date of Patent: Sep. 15, 2015

(54) AUTOMATIC VERIFICATION BY COMPARING USER INTERFACE IMAGES

(71) Applicant: Yahoo! Inc., Sunnyvale, CA (US)

(72) Inventors: George Betak, Palo Alto, CA (US); Mohammed Abualrob, Milpitas, CA (US)

(73) Assignee: YAHOO! INC., Sunnyvale, CA (US)

( * ) Notice: Subject to any disclaimer, the term of this patent is extended or adjusted under 35 U.S.C. 154(b) by 0 days.

(21) Appl. No.: 14/030,480

(22) Filed: Sep. 18, 2013

(65) Prior Publication Data

US 2015/0082280 A1 Mar. 19, 2015

(51) Int. Cl.
 G06F 9/44 (2006.01)
 G06F 11/36 (2006.01)

(52) U.S. Cl.
 CPC .......... G06F 11/3692 (2013.01); G06F 11/368 (2013.01); G06F 11/3664 (2013.01); G06F 11/3684 (2013.01); G06F 11/3688 (2013.01)

(58) Field of Classification Search
 CPC ............... G06F 8/10; G06F 8/20; G06F 8/30; G06F 11/3664; G06F 11/3684; G06F 11/3688; G06F 9/44589
 See application file for complete search history.

(56) References Cited

U.S. PATENT DOCUMENTS

| | | | |
|---|---|---|---|
| 5,157,782 A | 10/1992 | Tuttle et al. | |
| 5,325,377 A | 6/1994 | Tuttle | |
| 5,335,342 A | 8/1994 | Pope et al. | |
| 5,475,843 A | 12/1995 | Halviatti et al. | |
| 5,594,892 A | 1/1997 | Bonne et al. | |
| 5,634,002 A | 5/1997 | Polk et al. | |
| 6,046,740 A | 4/2000 | LaRoche et al. | |
| 6,249,882 B1 | 6/2001 | Testardi | |
| 7,870,504 B1 | 1/2011 | McIntosh et al. | |
| 8,392,890 B2 * | 3/2013 | Miller | 717/127 |
| 8,498,473 B2 * | 7/2013 | Chong et al. | 715/234 |
| 8,650,493 B2 * | 2/2014 | Miller | 715/738 |
| 8,682,083 B2 * | 3/2014 | Kumar et al. | 382/218 |
| 2003/0053675 A1 | 3/2003 | Kuwabara | |
| 2003/0056150 A1 | 3/2003 | Dubovsky | |
| 2009/0148033 A1 | 6/2009 | Alumot et al. | |

(Continued)

OTHER PUBLICATIONS

Tsung-Hsiang Chang "Using Graphical Representation of User Interfaces as Visual References", Jun. 2012, Massachusetts Institute of Technology, pp. 1-133; <https://groups.csail.mit.edu/uid/other-pubs/vgod-thesis.pdf>.*

Yeh et al., "Sikuli: Using GUI Screenshots for Search and Automation", 2009 ACM, UIST'09, Oct. 4, 2009, pp. 1-10; <http://dl.acm.org/results.cfm?h=1&cfid=507756040&cftoken=20800184>.*

(Continued)

*Primary Examiner* — Thuy Dao
*Assistant Examiner* — Ben C Wang
(74) *Attorney, Agent, or Firm* — James J. DeCarlo; Greenberg Traurig, LLP

(57) ABSTRACT

A method, apparatus and software related product (e.g., a computer readable memory) are presented for automatic testing of software products such as front-ends of computing devices. Various embodiments described herein can simplify the delivery and verification of software products and services across computing devices and screens by comparing user interface images using image analysis. For example, a screen buffer or visual representation of a new version of a software application can be compared with those representations generated using one or more previously released (positively tested) software versions of that application. This can broaden the reach of the solution and facilitate automation of workflows, which previously required human interaction.

13 Claims, 12 Drawing Sheets

(56) References Cited

U.S. PATENT DOCUMENTS

| | | | |
|---|---|---|---|
| 2011/0276946 A1* | 11/2011 | Pletter | 717/124 |
| 2012/0051634 A1* | 3/2012 | Chong et al. | 382/165 |
| 2012/0059919 A1* | 3/2012 | Glaser et al. | 709/223 |
| 2012/0204091 A1* | 8/2012 | Sullivan et al. | 715/234 |
| 2013/0007711 A1* | 1/2013 | Fryc et al. | 717/124 |
| 2013/0019171 A1* | 1/2013 | Mounty et al. | 715/704 |
| 2013/0074043 A1* | 3/2013 | Fu | 717/125 |
| 2013/0339930 A1* | 12/2013 | Xu | 717/125 |
| 2014/0075344 A1* | 3/2014 | Bentrup | 715/760 |
| 2014/0181705 A1* | 6/2014 | Hey et al. | 715/764 |
| 2014/0253559 A1* | 9/2014 | Li et al. | 345/467 |
| 2015/0020052 A1* | 1/2015 | Saar et al. | 717/124 |
| 2015/0082279 A1* | 3/2015 | Jakobs et al. | 717/124 |
| 2015/0106791 A1* | 4/2015 | Karuppiah et al. | 717/127 |

OTHER PUBLICATIONS

Lin et al., "Improving the Accuracy of Automated GUI Testing for Embedded Systems", IEEE, Jan. 2014, pp. 39-45; <http://ieeexplore.ieee.org/stamp/stamp.jsp?arnumber=6576113>.*

Shirazi et al., "Insights into Layout Patterns of Mobile User Interfaces by an Automatic Analysis of Android Apps", 2013 ACM, EICS'13, Jun. 24, 2013, pp. 1-10; <http://dl.acm.org/results.cfm?h=1&cfid=507756040&cftoken=20800184>.*

Singh et al., "Comparative Analysis of Open Source Automated Software Testing Tools: Selenium, Sikuli and Watir", May 14, 2014 International Research Publications House, ISSN 0974-2239, vol. 4, No. 15, pp. 1507-1518; <www.ripublication.com/irph/ijict_spl/ijictv4n15spl_04.pdf>.*

* cited by examiner

AUTOMATIC VERIFICATION BY COMPARING USER INTERFACE IMAGES

FIELD

The present disclosure relates to testing of software, and more specifically to automatic testing of software products such as front-ends of computing devices using comparing user interface images using image analysis.

BACKGROUND

The following abbreviations that may be found in the specification and/or the drawing figures are defined as follows:
  AJAX Asynchronous Java Script and XML
  API Application Programming Interface
  CSS locator Selector that matches against an element in a document tree
  DOM Document Object Model
  DVR Digital Video Recorder
  FF browser Firefox (open source Mozilla-based)
  GUI Graphical User Interface
  HTML Hypertext Markup Language
  ID Unique Identifier
  IDE Integrated Development Environment
  IE Internet Explorer
  JNI Java Native Interface
  MIT Massachusetts Institute of Technology
  OpenCV Open Source Computer Vision Library
  OS Operating System
  RPC Remote Procedure Call
  SDK Software Development Kit
  ID Unique Identifier
  UI User Interface
  XML Extensible Markup Language The user-facing portion of any computer or mobile application, also called the front-end, is notoriously difficult to test automatically.

User-facing applications, such as web applications, change frequently. For example, the layout is adjusted when new features are added, and the graphical user interface (GUI) is improved, refreshed, translated or otherwise adapted for different needs or to different markets.

There is also the well-known problem with dynamic content, such as ads, stock tickers or incoming email messages or notifications. Additionally, network latency, which can manifest itself when using AJAX or other forms of scripting, and when the content is loaded from different geographic locations. All these factors combined pose a significant challenge for test automation, because they introduce an element of variability and unpredictability. Unpredictable software changes represent the worst-case scenario, since they go against the entire concept of using computers to test other computers automatically.

SUMMARY

According to a first aspect, a method comprising: automatically testing, by a computer test system, a latest version of software under test and one or more previous versions of the software, results of the automatic testing being generated using a data feed identical to both the latest version of software under test and to the one or more previous versions of the software, the one or more previous versions of software having been positively tested before the present automatic testing; comparing, using a predetermined criterion, the results of the automatic testing of the latest version of the software under test with further results of the automatic testing of the one or more previous versions of the software; and determining whether the latest version of software under test is positively tested based on said comparison.

In another aspect, the automatic testing is performed using an image based test.

In another aspect, the data feed for performing the automatic testing is provided by the computer test system or by a further computer system.

In another aspect, automatic testing of the latest version of software under test and one or more previous versions of the software is performed using one computing device comprising one or more processors.

In another aspect, the computer test system comprises the one computing device.

In another aspect, automatic testing of the latest version of software under test is performed using a first computing device and automatic testing of the one or more previous versions of the software is performed using one or more further computing devices each having at least one processor.

In another aspect, a number of the one or more further computing devices is a finite odd integer.

In another aspect, the data feed for performing the automatic testing automatic testing is a variable data feed.

In another aspect, the variable data feed is performed at least in part to provide image based testing of the latest version of software.

In another aspect, the data feed for performing the automatic testing automatic testing is a predefined static data feed.

In another aspect, the further results of the automatic testing of the one or more previous versions of the software are pre-recorded.

In another aspect, the automatic testing is performed using both an image based test and an object based test.

In another aspect, the image based test and the object based test are performed using one framework with an integrated development environment.

In another aspect, the one framework is a Robot Framework, which is configured to integrate libraries for the object based and the image based test.

In another aspect, the object based test is performed using a Selenium web test automation framework, and the image based test is performed using a Sikuli test library.

In another aspect, automatic testing of the latest version of software under test and one or more previous versions of the software are performed in real time or near real time.

According to a second aspect, an apparatus comprising: a processor; a storage medium for tangibly storing thereon program logic for execution by the processor, the program logic comprising: logic to automatically test a latest version of software under test and one or more previous versions of the software, results of the automatic testing being generated using a data feed identical to both the latest version of software under test and to the one or more previous versions of the software, the one or more previous versions of software having been positively tested before the present automatic testing; logic to comparing, using a predetermined criterion, the results of the automatic testing of the latest version of the software under test with further results of the automatic testing of the one or more previous versions of the software; and logic to determine whether the latest version of software under test is positively tested based on said comparison. Further, the automatic test may be performed using an image based test.

According to a third aspect, a non-transitory computer readable storage medium tangibly storing computer program instructions capable of being executed by a computer processor, the computer program instructions defining code for: automatically testing, by a computer test system, a latest version of software under test and one or more previous versions of the software, results of the automatic testing being generated using a data feed identical to both the latest version of software under test and to the one or more previous versions of the software, the one or more previous versions of software having been positively tested before the present automatic testing; comparing, using a predetermined criterion, the results of the automatic testing of the latest version of the software under test with further results of the automatic testing of the one or more previous versions of the software; and determining whether the latest version of software under test is positively tested based on said comparison. Further, the automatic test may be performed using an image based test.

BRIEF DESCRIPTION OF THE DRAWINGS

For a better understanding of the nature and objects of the exemplary embodiments, reference is made to the following detailed description taken in conjunction with the following drawings. In the drawing figures, which are not to scale, and where like reference numerals indicate like elements throughout the several views.

DESCRIPTION OF EMBODIMENTS

Figure 1:
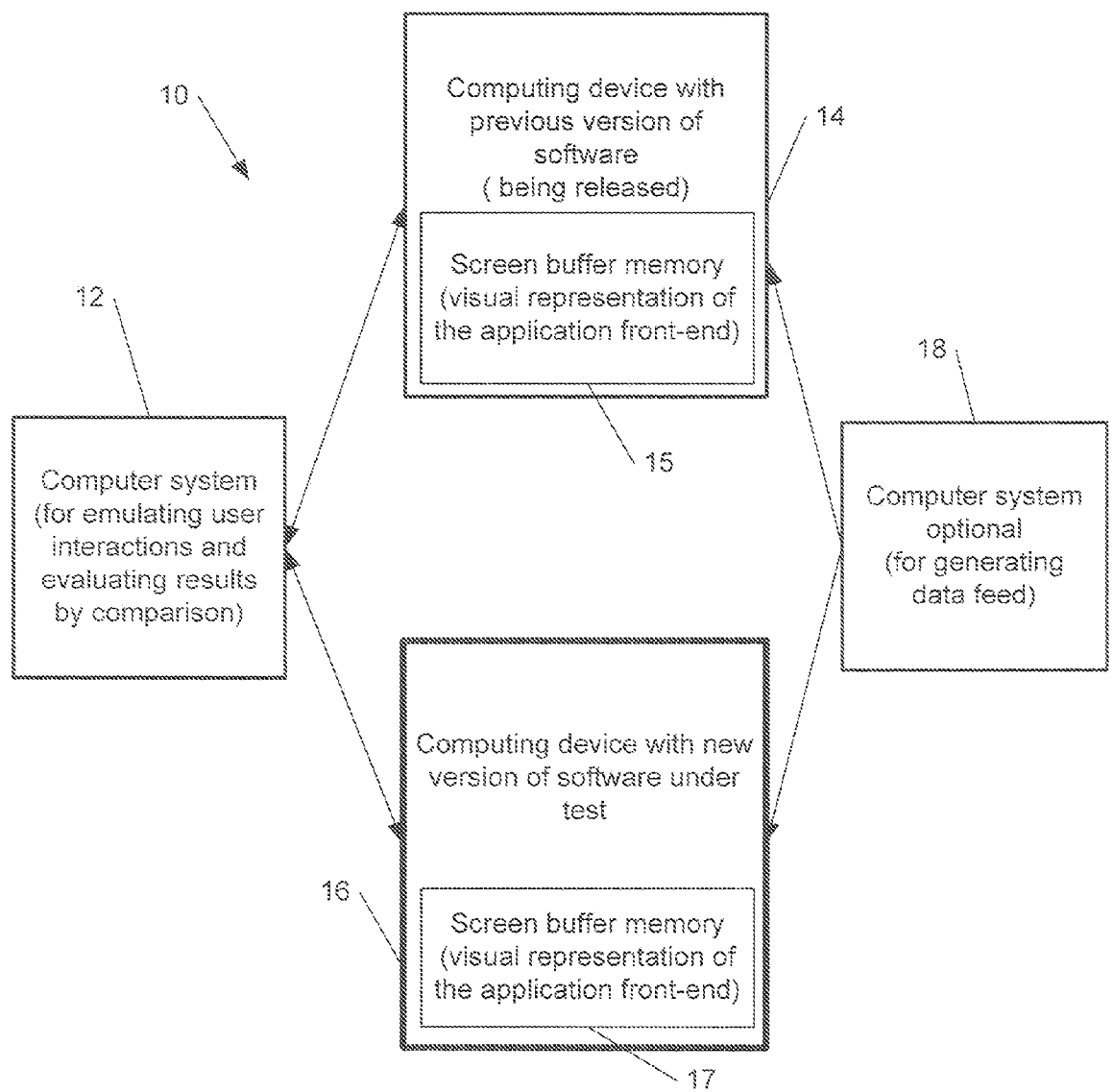
FIG. 1 is a block diagram of an automatic computer test system illustrating an exemplary embodiment for automatic software test system using a comparison method.

Embodiments are now discussed in more detail referring to the drawings that accompany the present application. In the accompanying drawings, like and/or corresponding elements are referred to by like reference numbers/characters throughout the drawings.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

By way of a further introduction, dynamic content and network latency can be often mitigated by strategically placing delays or wait statements. Changes to the front-end itself, such as addition of new objects like buttons and text boxes or the alteration of workflows, might require corresponding changes to the test framework.

All of this has implications not just for the front-end automation, but also for test automation in general. It's an investment, which needs to be planned thoughtfully, and will require constant management and supervision. Automation should be implemented correctly, otherwise a penalty will be incurred later in the form of unnecessary maintenance cost, when trying to adapt test frameworks to keep pace with evolving and ever changing software products.

Changes and new features are common in computer and mobile applications, which is one of the main reasons for the general lack of test automation. Another factor is the lack of robust, flexible and reliable test automation tools.

Businesses and software vendors often have no choice but to keep adding new features and making modifications to the front-end user interface (UI) to accommodate changing business needs. On the other hand, there are many new and emerging technologies, with growing number of frameworks and tools for testing front-end applications to select from. It's important to keep in mind however, that relying on any one technology or idea might not satisfy all the testing needs. A couple of types of front-end test automation solutions (object-based and image-based solutions) are further discussed. Each approach satisfies certain needs and has its own strengths and weaknesses.

In reference to object test automation, it is understood that every test automation tool is expected to simulate user actions programmatically. Such tools have to identify discrete GUI objects on the screen (buttons, labels, etc.), and then trigger events or perform action on these objects (clicks, text entry, etc.). Object-based test automation tools attempt to identify such objects on the screen by means of an ID (unique identifier) or some other deterministic feature, such as their path within the object hierarchy, which is similar to identifying a location by providing an intersection of two streets in the real world.

One example of this type of approach is Selenium web test automation framework (others may include, for example, Watir for web automation, FEST and Robotium for Java and Android automation respectively, etc.). Selenium uses locators to identify objects in an HTML document. Locators can be as simple as an object ID, or a bit more complex, such as XPath or CSS locator. The latter two represent a path within an object hierarchy. In either case, the DOM (Document Object Model) provides the context, where this type of identification makes sense. This object model is characteristic for web applications. Java or native OS applications may use a similar but differently implemented object model, which would provide the same type of context for screen objects.

Object-based automation tools are well suited for testing functional aspects of the application, such as submitting forms or performing other tasks by clicking on buttons or links. This approach ignores the visual aspects of the application under test, and a visual artifact or impairment are considered to be immaterial, if it does not break some essential functionality, which happened to be covered by test automation. In order to compensate for this limitation, image-based solutions, as further described herein.

Object-based testing is typically used to verify functional aspects and features, but this approach is impervious to the visual aspects of the application. Image-based test automation has historically not been as popular as object based test automation. It is a nascent field, which will require some time to mature, and find broader acceptance. Image-based test frameworks are typically not aware of the type of application under test. The test tool is not aware which logical objects were present on the screen during the test. Instead, such frameworks search the computer screen buffer for image patterns utilizing computer vision algorithms and heuristics.

For example, in order to identify a button on the screen, the algorithm will look in the screen buffer for a matching image pattern, which resembles the button as closely as specified. Image-based solutions can transcend application type boundaries (desktop or web), browser differences (IE or FF), object locators (XPath, CSS, Object ID) or even operating systems (Windows, Mac).

Moreover, image-based testing can perform visual inspection of the application under test, which could not be conducted using any other automation approach. There are numerous test scenarios, which would be either difficult or impossible to automate using object based-test automation frameworks such as Selenium. Here are just a few examples:

Phone unlock screen in mobile applications
Dynamic scrolling
Verifying display ads
Crossing application boundaries, e.g., web and native
Text orientation: detecting where the text sits in a text field
Detecting bidi-enabled fields (automatic orientation change based on input)
Mixing left-to-right and right-to-left text
Verifying color themes or styles
Verifying emoticons
Verifying logos or branding
Overall sanity testing (visiting main application UI and verifying objects)
High-level functional test coverage
Tofu and mojibake (glyph artifacts with typical appearance: □, ♦, °, etc.)
Text truncation and alignment
CSS and layout issues
Ads, Flash and Video
Drag and drop operations
Controlling sliders and more.

In general, anything of visual nature is better automated using image-based test automation. The image-based testing is a very powerful technique because it behaves like a human tester. It has the ability to tell what is on the screen, regardless of the underlying implementation details. However, the downside of this approach is that traditionally different expected images (screenshots) for each environment (browser, OS, language, etc.) were needed. Also, comparing images might give different results based on several factors, such as screen resolution and image quality. However, using contained environments for testing, such as virtual machines, addresses the consistency problem. Comparing a candidate build of an application against the previous version eliminates the need for pre-recorded desired test outcomes in the form of expected images (screenshots).

Traditionally, images were compared on a pixel-by-pixel basis, which made image-based testing appear fragile. Computer vision algorithms have matured in recent years, and image comparison can be a lot more sophisticated and robust without any significant performance penalty over traditional pixel-by-pixel comparison. Instead, simple parameters, such as an image similarity factor, can be exposed for convenience. In other words, image quality can be evaluated by adjusting some of the parameters in the underlying image-comparison algorithm. This may be accomplished using an image-based automation tool called Sikuli.

Sikuli is an academic and research project at the MIT. It is an open source image based technology to automate testing of graphical user interfaces (GUI). Sikuli supports major OS platforms (Windows, Mac and Linux). It comes with an integrated development environment (IDE), which may be used for developing and debugging high-level visual scripts. The IDE is not used directly in test automation, but the quality engineer can use it for his or her advantage. Sikuli can provide visual inspection automation. It can be integrated as a library into higher-level execution frameworks such as Robot Framework. The core of Sikuli script consists from Java, and in addition to comparing images (screenshots) against the screen buffer, can deliver keyboard and mouse events to appropriate locations on the screen. Image recognition is provided by OpenCV (Open Source Computer Vision) C++ engine that is connected to Java via JNI (Java Native Interface).

A method, apparatus and software related product (e.g., a computer readable memory or storage device) are presented for automatic testing of software products such as front-ends of computing devices. Various embodiments described herein can simplify the delivery and verification of software products and services across computing devices and screens by comparing user interface images using image analysis. For example, a screen buffer or visual representation of a new version of a software application can be compared with those representations generated using one or more previously released software versions of that application. This can broaden the reach of the solution and facilitate automation of workflows, which previously required human interaction. Using test procedures described herein will cover detection and placement of ads, visual verification of an application being launched, dynamic navigation for infinite scrolling, screen unlocks and other scenarios, or the discovery of visual artifacts and layout issues in products, which were translated for release into a foreign market and the like.

The embodiments described herein can simplify the delivery and verification of software products and services across various devices and screens. It can leverage the advances in computer vision, which when combined with a specific approach, can be used to automatically detect regressions and validate new application and website versions. Classic approaches typically rely on human testers, who script elaborate workflows, and set multiple validation criteria. The new approach can validate an application based on a series of screenshots, and the upfront investment in scripting, and the cost for ongoing test suite maintenance can be reduced.

The method of comparison may help identify the regions of the screen that are expected to stay the same, such as navigation menus or containers, footer, header, logo and any permanent layout and design elements. Likewise, portions of the screen, which can change, such as display ads or mailbox contents could be identified as well. Tools and libraries, which can help with this comparison, are available (Sikuli, ABBYY SDK, etc.), as discussed further herein. Thus the need for elaborate test scripts is eliminated.

Moreover, the learning of that comparison can be then applied to an automated review of a new version of the application. If the screen areas that are expected to stay the same did not register a change when compared to the previous version, the application passes. If differences have been identified, the new and old screen buffer would be flagged for review or a bug (defect) might be automatically filed to trigger triage by a human tester.

The overwhelming majority of application functionality, layout and UI (user interface) do not change between incremental builds or versions of the same application. While code changes might be known, it's difficult to predict which modifications, if any, will be visible on the frontend. If computer vision and machine learning could be used to cover the bulk of the review automatically, when a new application is released, the utility of human testers and product quality would be improved. Significant cost savings could be realized as well. For example, a linguistic and a UI review of an application in all languages, which it has been translated into, is typically quite expensive. This can pose a logistical challenge as well, especially if testers with fluency in each supported language were needed.

Thus according to one embodiment, a testing computer system can automatically test the latest version of software under test and one or more previous versions of the software using identical data feeds for both the latest version of software under test and for one or more previous versions of the software (the one or more previous versions of software have been already released). Then the testing computer system can determine whether the latest version of software under test is adequate to be released by comparing, using a predetermined criterion, results of the automatic testing of the latest version of the software under test with further results of the automatic testing of the one or more previous versions of the software.

For example, the predetermined criterion can be a degree of similarity between a new version and an old version of the software (software application) under test. The goal is to have the old and the new software to be identical. Two images, even though they might look the same, should not be expected to be 100% identical. Pixel intensity can vary across images. This assumption applies, even if the images have the same size and quality. Computer screen images, or screenshots, can exhibit a much larger degree of consistency. It is often possible to generate completely identical image files from a screen buffer. This is particularly true when the display settings, such as screen resolution and color depth, are set to the same value.

When such images are compared, a similarity measure or a similarity score is typically computed to determine the closeness of a match. The field of computer vision offers several possible approaches, and template matching is often used in this context. Sikuli utilizes the OpenCV library, which supports several methods of computing a similarity score, such as a normalized sum of absolute differences between pixel values or a normalized cross correlation. According to one embodiment, it can be possible to use a range of similarity scores instead of one particular value as the cut-off. For example, if a score greater than 95% is achieved, the image comparison would pass unconditionally. If a score between 85% and 95% is achieved, then some minor differences between the images can be expected. The test would conditionally pass, and a review may be indicated. And finally, if a score of less than 85% was achieved, the image comparison fails, and a review is indicated.

The fundamental idea is to make sure that the images are almost exactly the same, but since doing pixel-perfect comparison has historically proven to be fragile, it is found through experimentation that selecting high but not perfect similarity between images is preferable in most cases. This will still detect defects such as misplaced interpunction, missing letters or different colors, but it will not trigger manual review for minor imperfections, which was historically a problem with image-based testing.

The accuracy of the comparison and image matching will depend on the application. In the verification testing described herein, detecting changes that are somewhat subtle, such as date formats that have inadvertently changed, or partially cutoff letters or truncated words due to layout and design changes from one version to another, are often of interest. This is why the images should be nearly identical or identical, and a very close match should be tested for, if that does not result in a high number of false positive reports.

Data feeds for performing the automatic testing can be provided by the testing computer system or by a further computer system. Should no data feed be required, when testing applications operating on local data, such as word or image processors, this system component will be omitted. The automatic testing of the latest version of software under test and one or more previous versions of the software under test can be performed using one computing device comprising one or more processors. Thus the testing computer system can comprise only one computing device.

On the other hand, generally, automatic testing of the latest version of software under test can be performed using a first computing device, and automatic testing of the one or more previous versions of the software can be performed using one or more further computing devices each having at least one processor. The number of the one or more previous versions automatically tested can be a finite odd or even integer. Using the finite odd number of the previous software application versions automatically tested may provide a more conclusive and accurate results, because in case of split results among tested previous versions of the software application, determining the "correct" result of the visual representation of the screen may be determined with a better certainty for the odd number of the previous software applications version. In other words, if three previous versions of software are tested and two of them show similar results that should be considered a "right expected" result. However, if only two previous versions are tested and show different results, it would be difficult to determine what is the "right" one.

Moreover, according to another embodiment, automatic testing using the comparison approach described herein can be performed using a variable data feed. The variable data feed can be performed at least in part to provide image based testing of the latest version of software, but in general it may be used to support other kind of testing such as object based testing as well. Also, automatic testing can be performed using a predefined static data feed for image based and/or static based testing.

Furthermore, automatic testing of the latest version of software under test and one or more previous versions of the software can be performed in real time or near real time. Alternatively, in case of the predefined static data feed, the further results of the automatic testing of the one or more previous versions of the software can be pre-recorded and used for the comparison as described herein.

According to another embodiment, the testing computer system can automatically test software under test using the comparison approach described herein, for different types of testing, for example for the image based test, object based test and the like. It can also perform automatic testing of a unique combination at least of the image based test and the object based test. For example, the image based test and the object based test can be performed using one, which makes provisions for extensibility of its core functionality. One such framework can be a Robot Framework, which may be configured to integrate libraries for the object oriented test and for the image based test. For example, the Robot Framework can be used to perform the object based test using a Selenium web test automation framework and the image based test using a Sikuli library. Another example would be the Cucumber framework in conjunction with Watir.

In this embodiment, the Robot Framework can be considered as a higher-level test execution engine, where the Robot Framework would not perform the actual test actions on its own however it invokes these actions from libraries exposed to the framework. For example, for testing a web application any available Selenium library specifically written for Robot Framework can be used in order to do the actual clicks and GUI interaction. Sikuli can be exposed to Robot Framework as a library. In order to integrate Sikuli and Selenium into Robot Framework the following non-limiting guidelines/considerations can be applied:

Sikuli is Java based so it can be called from a Jython script;
Robot Framework is Python based;
Selenium (web driver) Robot Framework library is Python based;
It is not possible to use one Python interpreter to run both (Sikuli and Selenium) at the same time;
Selenium can be run on a local machine using Python;
Sikuli can run as a service on a remote or local machine using Jython (use the local host as the remote machine);
Expose Sikuli visual API keywords can be exposed using RPC-xml (remote procedure call);
The end result is a seamless Sikuli and Selenium integration.

Various embodiments described herein can simplify the delivery and verification of software products and services across computing devices and screens. The advantage of the comparison approach described herein for software testing is that it could eliminate the bulk of the cost involved in testing of incremental releases.

Unit tests and other module-level tests cannot and will not provide the coverage for a visual smoke or acceptance test of the complete application. Moreover, most of the testing in the computer industry today relies on the object-oriented approaches. The embodiments described herein can use a "code to test code" approach.

According to embodiments described herein, applications can be loaded from internal build environments automatically, screen locks can be unlocked, screenshots can be taken while testing and used for dynamic navigation, which is necessary for infinite scroll screens, ads can be found and matched visually, etc.

FIG. 1 shows a non-limiting example of a block diagram of an automatic computer test system 10 for implementing comparison of results generated by a new version of software application with results generated using previously released versions of the same software application. Testing of a computing device 16 comprising a new version of software under test and of a computer device 14 comprising a previous version of that software (being released and/or positively tested before) is performed by a computer system 12. As stated herein, testing may include dynamic based test and/or static based test (e.g., by emulating user interactions and evaluating results using one common framework). Each of the computing devices 14 and 16 comprise a screen buffer memory, 15 and 17 respectively, for visual representation of the application front-end. An optional computer system 18 can be used for generating identical data feed (dynamic/live variable or predetermined static) to the computing devices 16 and 14. Results of the visual representation of the screen (frond-end) generated by computing devices 16 and 14 can be stored in the corresponding buffer memories, 15 and 17 and then can be provided to the computer system 12 for comparison, according to exemplary embodiments described herein. Generating comparison results according to a predetermined criterion by the computer system 12 is performed for determining whether the latest version of software under test is adequate to be released.

It should be noted that the computer system 18 can be integrated with the computer system 12 (so that generating repeatable predefined data can be performed by the computer system 12). Also it should be understood that the computing devices 14 and/or 16 may be combined in one device or integrated with the computer system 12 using one or more processors and one or more screens for visual representation of the application front-ends. These representations may be presented in multiple screens or sequentially in time on one screen.

Figure 2:
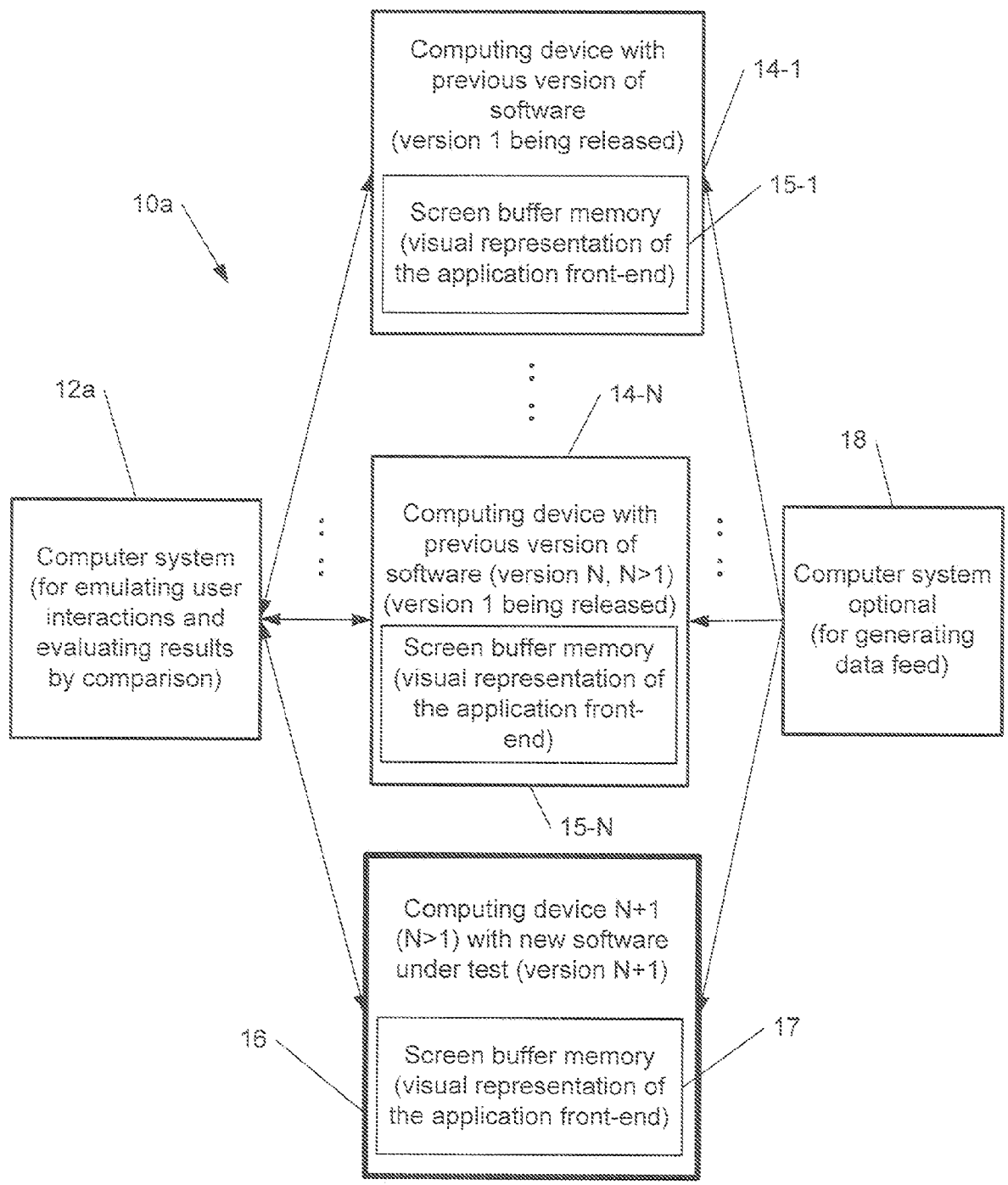
FIG. 2 is another block diagram illustrating an exemplary embodiment for automatic computer test system using a comparison method based on testing of multiple previous versions.

FIG. 2 shows another non-limiting example of a block diagram of an automatic computer test system 10*a* for implementing comparison of results generated by a new version of software application with results generated using previously released versions of the same software application. The test configuration of FIG. 2 demonstrates a further development of the test configuration shown in FIG. 1. The difference is that FIG. 2 shows a generalized block diagram illustrating the use of more than one (or N, N being a finite integer of more than one) previously released versions of the same software application for testing, thus allowing to reach more precise and conclusive results.

Testing of a computing device 16 comprising a new version of software under test and of a computer devices 14-1, 14-2, ..., 14-N comprising previous versions (1, 2, ..., N) of that software (being already released) is performed by a computer system 12*a*. As stated herein, testing may include dynamic based test and/or static based test (e.g., by emulating user interactions and evaluating results using one common framework). Each of the computing devices 14-1, 14-2, ..., 14-N and 16 can comprise a screen and a buffer memory, 15-1, 15-2, ..., 15-N and 17 respectively, for visual representation of the application front-end. An optional computer system 18 can be used for generating identical data feed (dynamic/live variable or predetermined static) to the computing devices 16 and 14-1, 14-2, ..., 14-N. Results of for the visual representation of the screen (frond-end) generated by computing devices 16 and 14-1, 14-2, ..., 14-N can be stored in the corresponding buffer memories, 15-1, 15-2, ..., 15-N and 17 and then provided to the computer system 12*a* for comparison, according to exemplary embodiments described herein. Generating comparison results between visual representation of the new version of the software application (by the computing device 16) and visual representations previous versions of the same software applications according to a predetermined criterion is performed by the computer system 12*a* for determining whether the latest version of software under test is adequate to be released.

Moreover, FIG. 2 shows N previous versions of the software application which can be tested by the computing devices 14-1, 14-2, ..., 14-N. Also, according to a further embodiment, only selected previous versions can be used for the automatic testing (which may be specified by a test operator). For example, only software application versions 2 through N, 3 through N, etc., or selected versions not in a consecutive order may be used for implementing the automatic comparison testing, described herein.

The number of the one or more previous software versions automatically tested can be a finite odd or even integer. As explained herein, using the finite odd number of the previous software application versions automatically tested can provide a more conclusive and accurate results, because in case of split results among tested previous versions of the software application, determining the "correct" result of a visual representation of the screen for the one or more previous versions of the software may be determined with a better certainty and accuracy. For example, if three previous versions are tested and two of them show similar results, that should be considered the "expected/correct" result to compare with.

It should be further noted that the computer system 18 can be integrated with the computer system 12*a*. Also it should be understood that the computing devices 14-1, 14-2, ..., 14-N and/or 16 may be combined in one device or integrated with the computer system 12 using one or more processors and one or more screens for visual representation of the application front-ends. These representations may be presented in multiple screens or sequentially in time on one screen and/or on a split screen.

Figure 3A:
FIGS. 3a and 3b is a non-limiting example of two screenshots (using live/variable data feed), which pass the similarity test for image based testing, according to an embodiment described herein.
Figure 3B:

FIGS. 3*a*-3*b*, 4, 5 and 6*a*-6*b* show non-limiting examples demonstrating various comparison scenarios based on similarity according to various embodiments described. FIGS. 3*a* and 3*b* show two screenshots 20*a* and 20*b* respectively using live (variable) data feed, which pass the similarity test for the image based testing.

Figure 4:
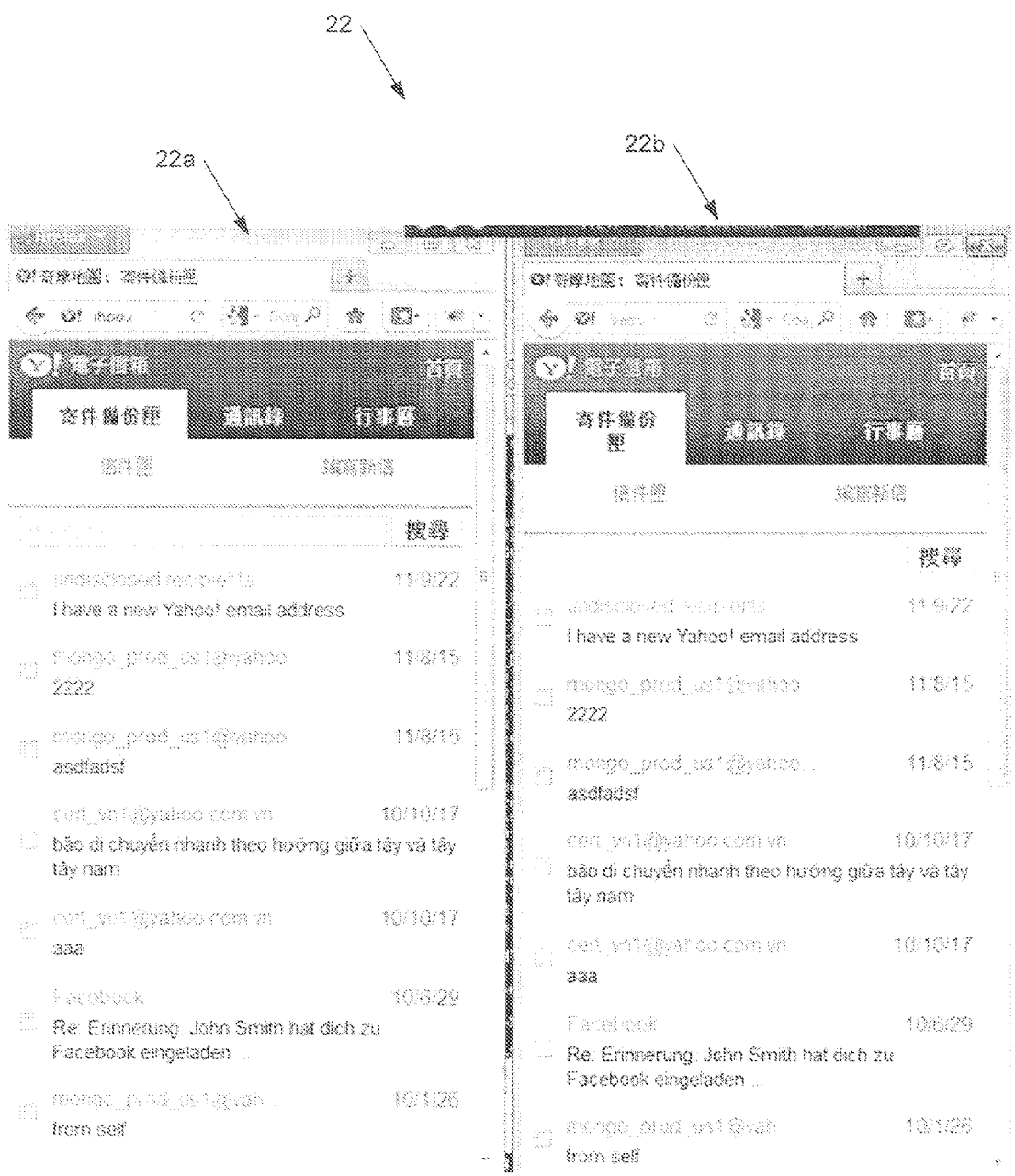
FIG. 4 is another non-limiting example demonstrating screenshots from BP Mail (Blue Print Mail), which is a web-based mail service for mobile phones, depicting an actual defect found through visual automation using static data feed, according to an embodiment described herein.

FIG. 4 shows another non-limiting example, which demonstrates screenshots from BP Mail (Blue Print Mail), a web-based mail service for mobile phones, depicting an actual defect found through visual automation described herein using a static data feed. When looking at the Mail interface on the screenshot, the left tab 22*a* is much taller than it should be (as shown on the right tab 22*b*). Then the tab 22*a* did not render properly in a candidate build of the product. This particular defect found in a test environment leveraging virtual machines and image-based testing was upon discovery successfully reproduced and validated on the physical target device.

Figure 5:
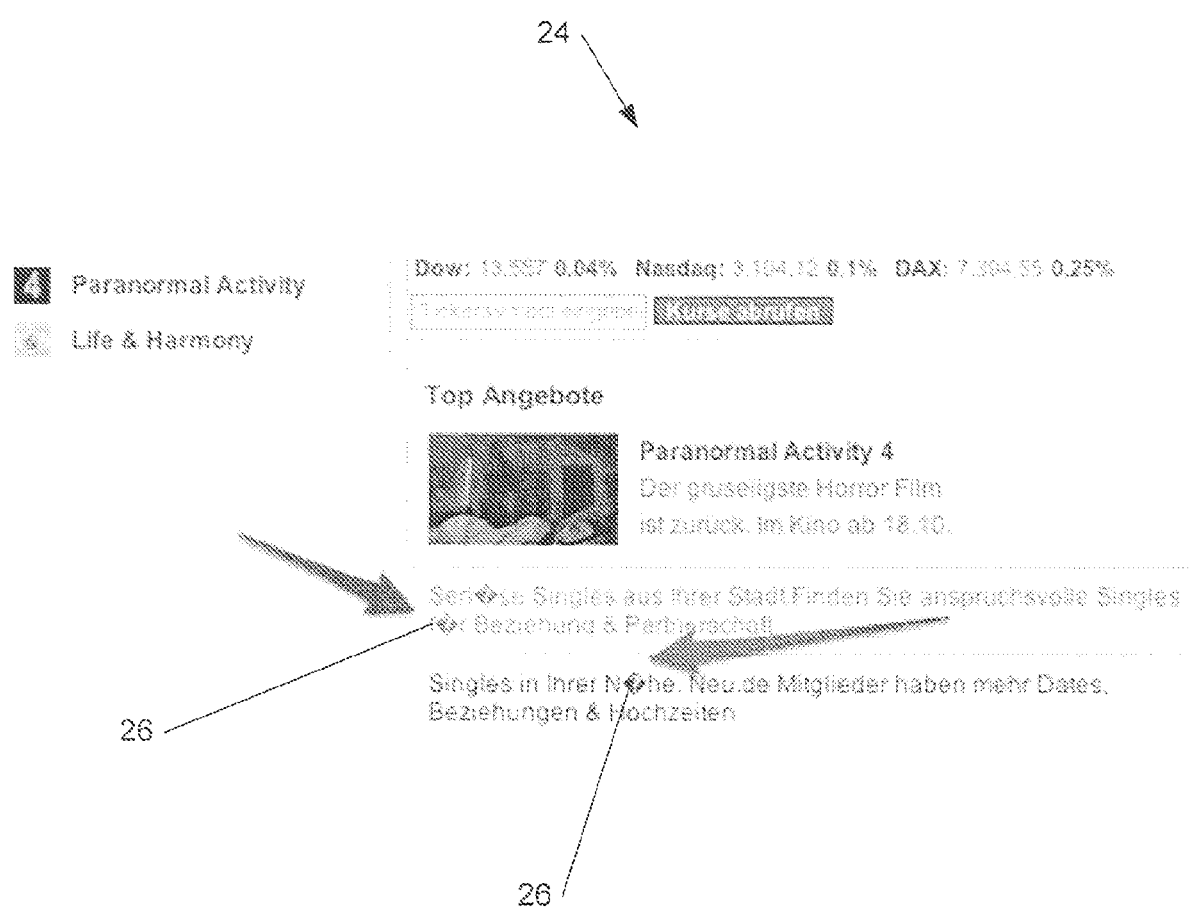
FIG. 5 is a further non-limiting example showing a screenshot with mojibake represented by a Unicode replacement character 26, which is defined by Unicode codepoint U+FFFD and exhibits a characteristic shape thus demonstrating an invalid representation of a character detectable through visual automation, according to an embodiment described herein.

FIG. 5 is a further non-limiting example showing a mojibake screenshot 24 with a Unicode replacement character 26. The symbol 26 is used when some text transformation yields an invalid representation of a character. It has a very typical shape, which is defined by Unicode codepoint U+FFFD. It occurs with some frequency, which makes it detectable through visual automation.

Figure 6A:
FIGS. 6a-6d are a non-limiting examples of three Flickr screenshots taken at slightly different times using dynamic (variable) content feed showing changing areas (FIGS. 6a-6c), which can be automatically detected and ignored or "masked" as shown in FIG. 6d when performing the comparison, according to an embodiment described herein.
Figure 6B:
Figure 6C:
Figure 6D:

FIGS. 6*a*-6*c* show three Flickr screen shorts 28*a*-28*c* taken at slightly different times (within few seconds of each other) using dynamic (variable) content feed. As a result, certain parts of the screen can change without notice: such as display ads or content or image highlights. It is seen from FIGS. 6*a*-6*c* that areas 32*a*-32*c* and 34-34*c* are changing. Therefore, the probability that this dynamic content will be identical between the old and new version of the software is low, because it depends on the state of the feed. Therefore, these sections of the screen can be ignored or "masked" (blacked out or cut out) when performing the comparison as shown in FIG. 6d where areas 38 and 40 are darkened. If these areas should be included in the comparison, then a static data feed could be used during the test.

Figure 7:
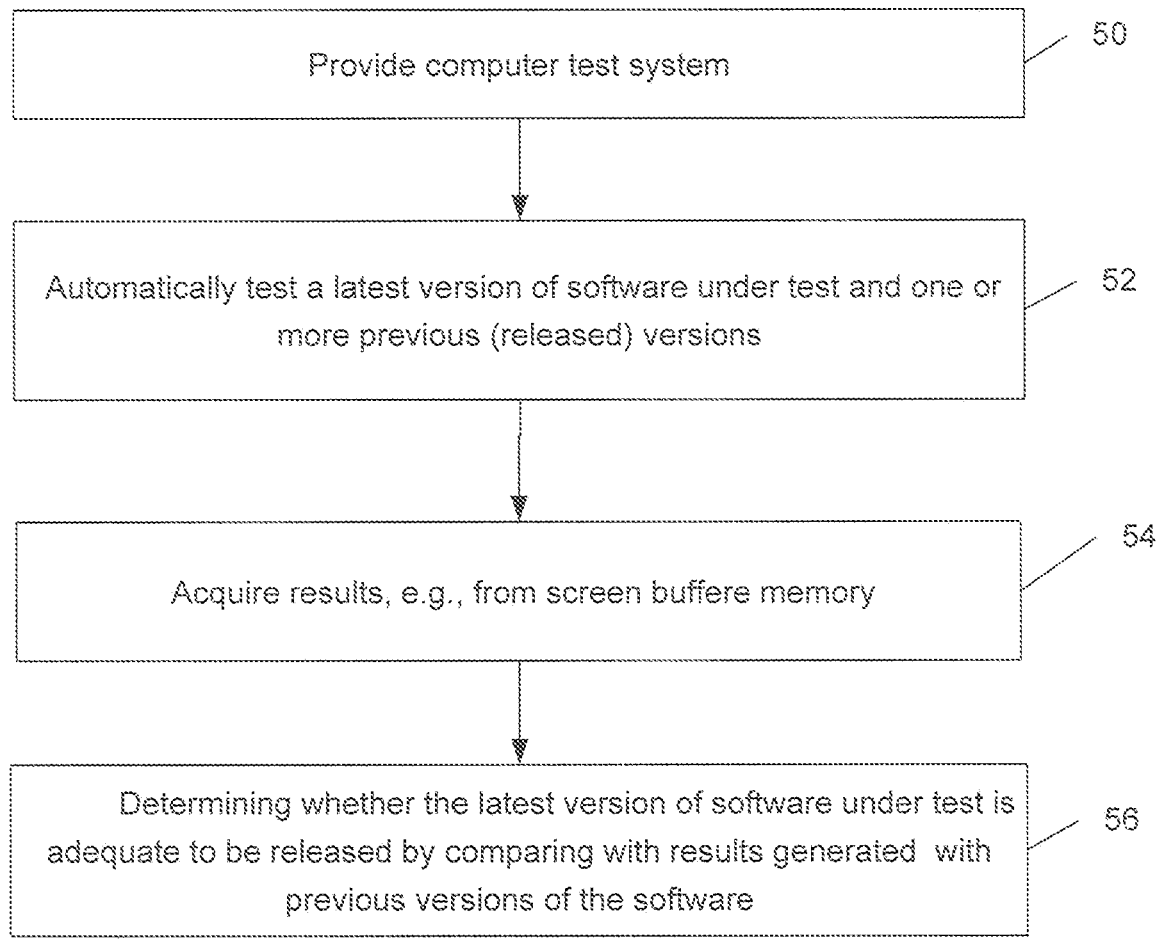
FIG. 7 is a flow chart illustrating implementation of various embodiments.

With reference now to FIG. 7, shown is a flow chart demonstrating implementation of the various illustrated embodiments. It is noted that the order of steps shown in FIG. 7 is not required, so in principle, the various steps may be performed out of the illustrated order. Also certain steps may be skipped, different steps may be added or substituted, or selected steps or groups of steps may be performed in a separate application following the embodiments described herein.

In a method according to the embodiment shown in FIG. 7, in a first step 50 a computer test system like the one shown in FIG. 1 or 2, is provided.

In a next step 52, the computer test system automatically tests a latest version of software under test and one or more previous versions of the software, where the one or more previous versions have been positively tested in the past.

In a next step 54, the computer test system automatically acquiring test results, for example, from a screen buffer memory. The screen buffer can be persisted in the form of an image (screenshot) file, stored, transmitted or accessed remotely, through a remote procedure call (RPC), for example.

In a next step 56, the computer test system compares, using a predetermined criterion, results of the automatic testing of the latest version of the software under test with further results of the automatic testing of the one or more previous versions of the software.

Figure 8:
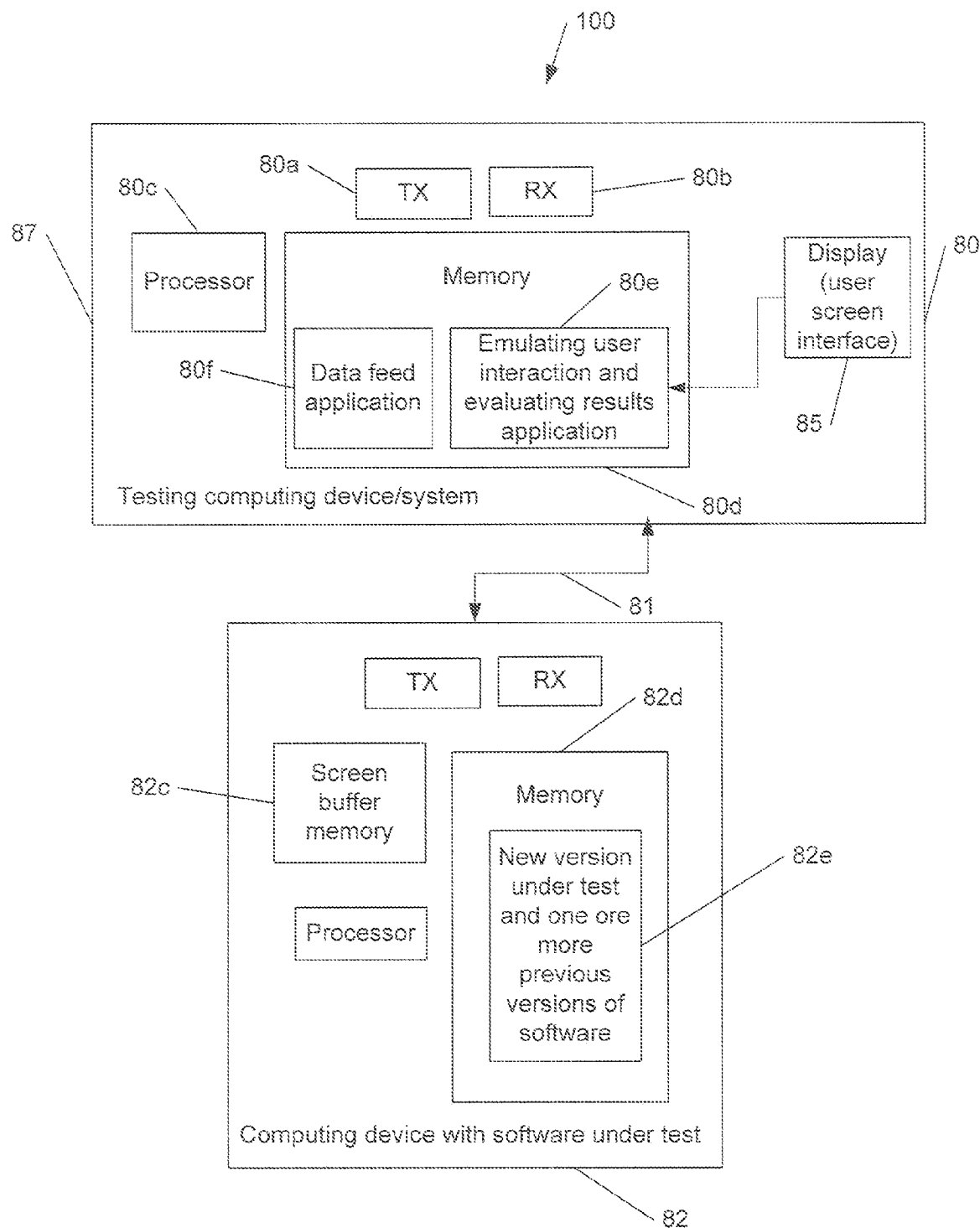
FIG. 8 is a block diagram illustrating computing/system devices for implementation of various embodiments.

In a next step 58, the computer test system determines whether the latest version of software under test is adequate to be released FIG. 8 shows an exemplary embodiment of a computing test device (apparatus/system) 80 and at least one computing device 82 comprising a software application under test in a computer test system 100. The computing device 82 may be a portable computer, a wireless device, smart phone, a tablet, etc. FIG. 8 is a simplified block diagram of various computing devices that are suitable for practicing the exemplary embodiments; components of a computing device are configured to cause that electronic device to operate.

The device 80 may comprise, e.g., at least one transmitter 80a, at least one receiver 80b, at least one processor 80c at least one memory 80d, a data feed application module 80f and an emulating user interaction and results evaluating application module 80e. The transmitter 80a and the receiver 80b may be configured to provide a wireless or wired communication with the computing device 82 comprising software under test (e.g., through a corresponding link 81) for software testing (e.g., image and/or object testing by comparison) according to the embodiments described herein. The transmitter 80a and the receiver 80b may be generally means for transmitting/receiving and may be implemented as a transceiver, or a structural equivalence thereof. It is further noted that the same requirements and considerations are applicable to transmitter and receiver of the computing device 82.

Various embodiments of the at least one memory 80d (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. The same considerations may be applicable to the cache memory 81. Various embodiments of the processor 80c include but are not limited to general-purpose computers, special purpose computers, microprocessors, digital signal processors (DSPs) and multi-core processors. Similar embodiments are applicable to memories and processors in the device 82 shown in FIG. 8.

The data feed application module 80f may provide various instructions to the computing device 82 for performing step 50 shown in FIG. 7, using the communication link 81. The module 80f may be implemented as an application computer program stored in the memory 80d, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor. Furthermore, the module 80f may be implemented as a separate block or may be combined with any other module/block of the computing device 80, or it may be split into several blocks according to their functionality.

The emulating user interaction and results evaluating application module 80e may provide various instructions for performing steps 54-56 shown in FIG. 7 and assist in performing step 52 in FIG. 7, using the communication link 81. The module 80e may be implemented as an application computer program stored in the memory 80d, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor. Furthermore, the module 80e may be implemented as a separate block or may be combined with any other module/block of the device 80, or it may be split into several blocks according to their functionality.

The computing device 82 may have similar components as the device 80, as shown in FIG. 8, so that the above discussion about components of the device 80 is fully applicable to the components of the computing device 82.

The computing device 82 can comprise new version of software under test and previous versions of software, which were released (i.e., being positively tested in the past). Also shown is at least one screen buffer memory 82c (it can be more than one screen buffers), which may store the screen images acquired or generated for the testing performed by the test computer device/system 80.

Figure 9:
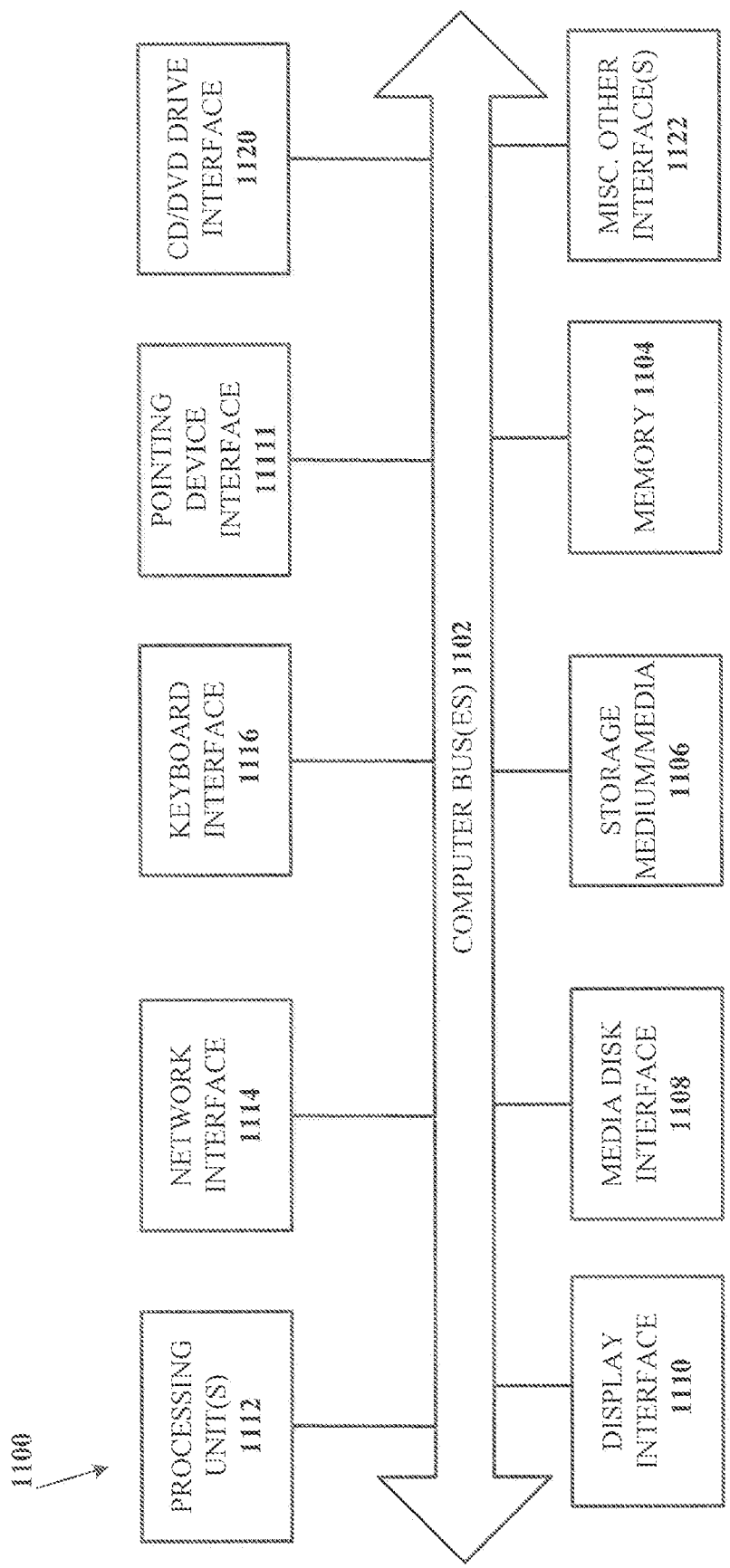
FIG. 9 illustrates an exemplary internal architecture of a computing device for implementing embodiments described herein.
Figure 10:
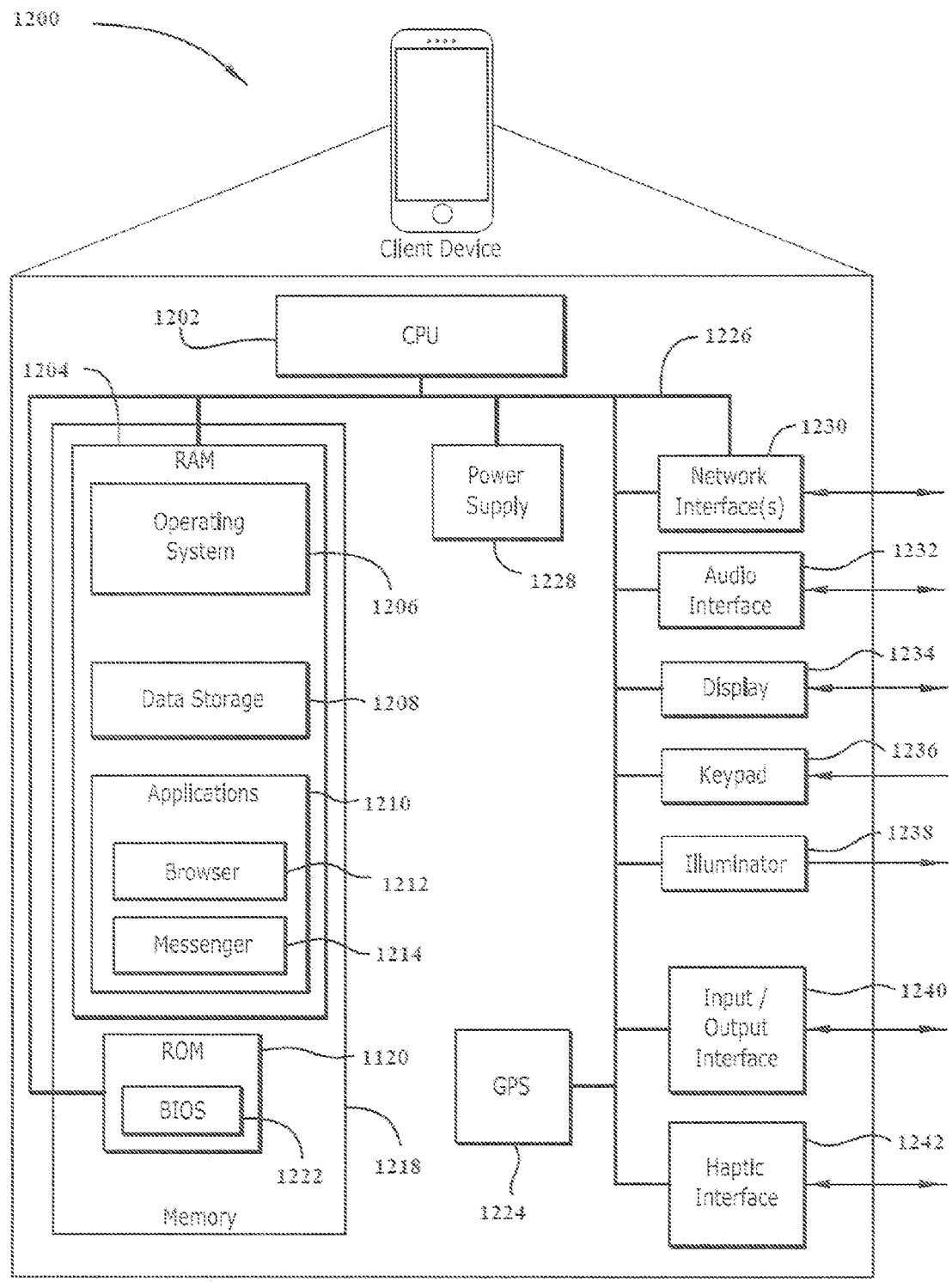
FIG. 10 is an exemplary schematic diagram illustrating a test device implementation of a computing device for implementing embodiments described herein.

FIGS. 9 and 10 provide further insight for implementation of various embodiments described herein using a computer device. The devices depicted in FIGS. 9 and 10 may interchangeably or in combination perform any of the functions described herein.

As shown in the example of FIG. 9, internal architecture of a computing device 1100 includes one or more processing units (also referred to herein as CPUs) 1112, which interface with at least one computer bus 1102. Also interfacing with computer bus 1102 are persistent storage medium/media 1106, network interface 1114, memory 1104, e.g., random access memory (RAM), run-time transient memory, read only memory (ROM), etc., media disk drive interface 1108, an interface 1120 for a drive that can read and/or write to media including removable media such as floppy, CD-ROM, DVD, etc., media, display interface 1110 as interface for a monitor or other display device, keyboard interface 1116 as interface for a keyboard, pointing device interface 1118 as an interface for a mouse or other pointing device, and miscellaneous other interfaces 1122 not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code or logic, and/or computer-executable process steps, incorporating functionality described herein, e.g., one or more of process flows described herein. CPU 1112 first loads computer-executable process steps or logic from storage, e.g., memory 1104, storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps. It is noted that the memory 1104 can include screen buffer memory 82c shown in FIG. 7.

Persistent storage medium/media 1006 is a computer readable storage medium(s) that can be used to store software and data, e.g., an operating system and one or more application programs. Persistent storage medium/media 1006 can also be used to store device drivers, such as one or more of a digital camera driver, monitor driver, printer driver, scanner driver, or other device drivers, web pages, content files, metadata, playlists and other files. Persistent storage medium/media 1006 can further include program modules and data files used to implement one or more embodiments of the present disclosure.

FIG. 10 is a schematic diagram illustrating a client device implementation of a computing device in accordance with embodiments of the present disclosure. A client device 1200 may include a computing device capable of sending or receiving signals, such as via a wired or a wireless network, and capable of running application software or "apps". A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 1202, power supply 1228, a memory 1218, ROM 1220, BIOS 1222, network interface(s) 1230, audio interface 1232, display 1234, keypad 1236, illuminator 1238, I/O interface 1240 interconnected via circuitry 1226. Claimed subject matter is intended to cover a wide range of potential variations. For example, the keypad 1236 of a cell phone may include a numeric keypad or a display 1234 of limited functionality, such as a monochrome liquid crystal display (LCD) for displaying text. In contrast, however, as another example, a web-enabled client device 1200 may include one or more physical or virtual keyboards 1236, mass storage, one or more accelerometers, one or more gyroscopes, global positioning system (GPS) 1224 or other location identifying type capability, Haptic interface 1242, or a display with a high degree of functionality, such as a touch-sensitive color 2D or 3D display, for example. The memory 1218 can include Random Access Memory 1204 including an area for data storage 1208. Also the memory 1104 can include screen buffer memory 82c shown in FIG. 7.

A client device 1200 may include or may execute a variety of operating systems 1206, including a personal computer operating system, such as a Windows, iOS or Linux, or a mobile operating system, such as iOS, Android, or Windows Mobile, or the like. A client device 1200 may include or may execute a variety of possible applications 1210, such as a client software application 1214 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1200 may also include or execute an application to communicate content, such as, for example, textual content, multimedia content, or the like. A client device 1200 may also include or execute an application 1212 to perform a variety of possible tasks, such as browsing, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in a machine-readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   automatically testing, by a processor, a latest version of software under test and one or more previous versions of the software, results of the automatic testing being generated using a data feed identical to both the latest version of software under test and to the one or more previous versions of the software, the one or more previous versions of the software having been positively tested before the present automatic testing, the one or more previous versions of the software having been previously released;
   comparing, by the processor using a predetermined criterion, the results of the automatic testing of the latest version of the software under test with further results of the automatic testing of the one or more previous versions of the software; and
   determining, by the processor, whether the latest version of the software under test is positively tested based on said comparison,
   wherein the automatic testing is performed using both an image based test and an object based test; and
   wherein the image based test and the object based test are performed using one framework with an integrated development environment.

2. The method of claim 1, wherein the data feed for performing the automatic testing is provided by the processor or by a further computer system.

3. The method of claim 1, wherein the automatic testing of the latest version of software under test is performed using a first computing device and automatic testing of the one or more previous versions of the software is performed using one or more further computing devices each having at least one processor.

4. The method of claim 3, wherein a number of the one or more further computing devices is a finite odd integer.

5. The method of claim 1, wherein the data feed for performing the automatic testing is a variable data feed.

6. The method of claim 5, wherein the variable data feed is performed at least in part to provide image based testing of the latest version of software.

7. The method of claim 6, wherein the further results of the automatic testing of the one or more previous versions of the software are pre-recorded.

8. The method of claim 1, wherein the data feed for performing the automatic testing is a predefined static data feed.

9. The method of claim 1, wherein the one framework is a Robot Framework, which is configured to integrate libraries for the object based test and the image based test.

10. The method of claim 1, wherein the object based test is performed using a Selenium web test automation framework, and the image based test is performed using a Sikuli test library.

11. The method of claim 1, wherein the automatic testing of the latest version of software under test and the one or more previous versions of the software are performed in real time or near real time.

12. An apparatus comprising:
    a processor;
    a storage medium for tangibly storing thereon program logic for execution by the processor, the program logic comprising:
    testing logic executed by the processor for automatically testing a latest version of software under test and one or more previous versions of the software, results of the automatic testing being generated using a data feed identical to both the latest version of software under test and to the one or more previous versions of the software, the one or more previous versions of the software having been positively tested before the present automatic testing, the one or more previous versions of the software having been previously released;
    comparing logic executed by the processor for comparing, using a predetermined criterion, the results of the automatic testing of the latest version of the software under test with further results of the automatic testing of the one or more previous versions of the software; and
    determining logic executed by the processor for determining whether the latest version of software under test is positively tested based on said comparison,
    wherein the automatic testing is performed using both an image based test and an object based test; and
    wherein the image based test and the object based test are performed using one framework with an integrated development environment.

13. A non-transitory computer readable storage medium tangibly storing computer program instructions capable of being executed by a computer processor, the computer program instructions defining instructions for:
    automatically testing, by the processor, a latest version of software under test and one or more previous versions of the software, results of the automatic testing being generated using a data feed identical to both the latest version of software under test and to the one or more previous versions of the software, the one or more previous versions of the software having been positively tested before the present automatic testing, the one or more previous versions of the software having been previously released;

comparing, by the processor using a predetermined criterion, the results of the automatic testing of the latest version of the software under test with further results of the automatic testing of the one or more previous versions of the software; and determining, by the processor, whether the latest version of software under test is positively tested based on said comparison, wherein the automatic testing is performed using both an image based test and an object based test; and wherein the image based test and the object based test are performed using one framework with an integrated development environment.

* * * * *